W. REINECKE, K. H. LANDGREBE & F. G. WILHELM.
POTATO PLANTER.
APPLICATION FILED JULY 6, 1908.
917,360.
Patented Apr. 6, 1909.
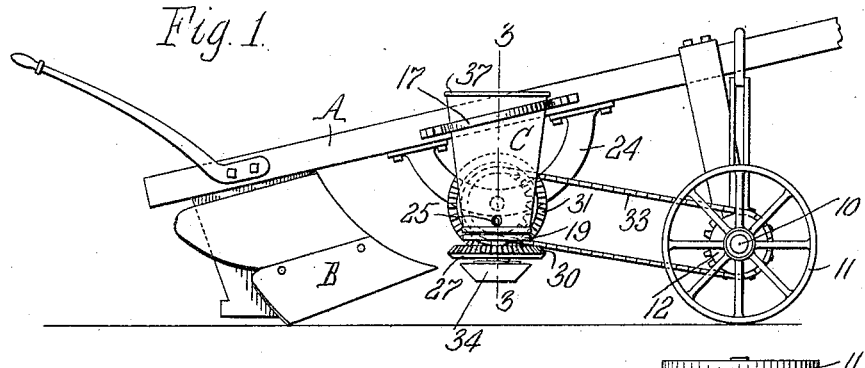
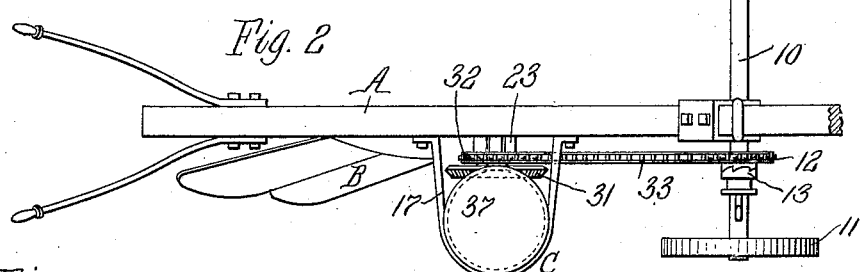
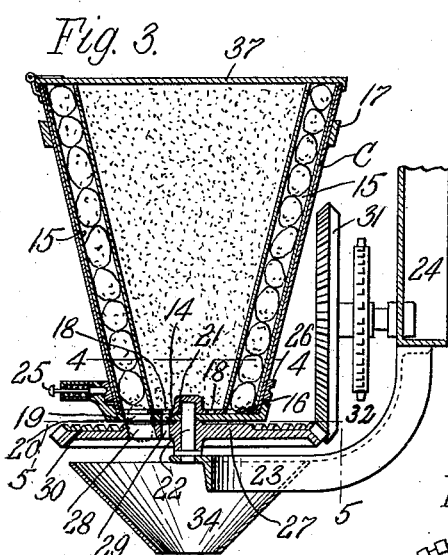
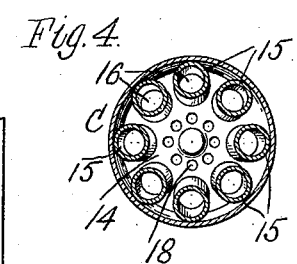
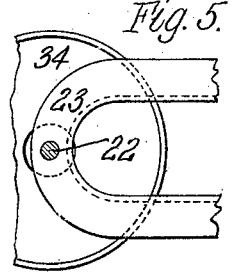
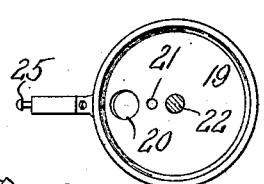
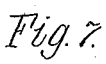
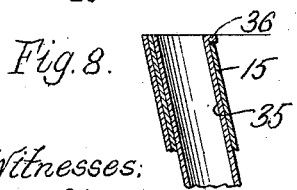
Witnesses:
A. F. Dimond.
E. A. Volk.
Inventors.
Wilhelm Reinecke,
Karl Heinrich Landgrebe,
Friedrich Gustav Wilhelm,
By Wilhelm, Parker & Hand,
Attorneys.

UNITED STATES PATENT OFFICE.

WILHELM REINECKE, OF SPEELE, KARL HEINRICH LANDGREBE, OF OBERVELLMAR, AND FRIEDRICH GUSTAV WILHELM, OF CASSEL, GERMANY, ASSIGNORS OF ONE-FIFTH TO HEINRICH DUELFER AND ONE-FIFTH TO THEODOR DRUBEL, OF CASSEL, GERMANY.

POTATO-PLANTER.

No. 917,360.  Specification of Letters Patent.  Patented April 6, 1909.

Application filed July 6, 1908. Serial No. 442,187.

*To all whom it may concern:*

Be it known that we, WILHELM REINECKE, KARL HEINRICH LANDGREBE, and FRIEDRICH GUSTAV WILHELM, subjects of the German Emperor, residing at Speele, Province of Hanover; Obervellmar, Province of Hesse-Nassau, and Cassel, Province of Hesse-Nassau, Germany, respectively, have invented a new and useful Improvement in Potato-Planters, of which the following is a specification.

This invention relates to that class of potato planters which comprise receptacles or magazines for the potatoes and for fertilizer and means for discharging with every potato or batch of potatoes an appropriate quantity of fertilizer.

The object of this invention is to improve the construction of these magazines or receptacles and of the means whereby the discharge of the potatoes and fertilizer is effected.

In the accompanying drawings: Figure 1 is a side elevation of a potato planter provided with our improvements. Fig. 2 is a top plan view of the same. Fig. 3 is a vertical cross section in line 3—3, Fig. 1, on an enlarged scale. Fig. 4 is a horizontal section in line 4—4, Fig. 3. Fig. 5 is a fragmentary horizontal section in line 5—5, Fig. 3. Fig. 6 is a top plan view of the cutoff plate. Fig. 7 is a top plan view of the feed disk. Fig. 8 is a fragmentary vertical section of one of the potato magazines provided with a removable lining.

Like reference characters refer to like parts in the several figures.

The machine represented in the accompanying drawings is designed to drop potatoes and the fertilizer into a furrow which has been previously formed in any suitable manner and to cover the dropped potatoes and fertilizer by earth turned into the furrow by means of a plow share or similar tool which is arranged in rear of the magazines, but this arrangement of the parts may be modified in various ways.

A represents the plow beam which carries at its rear end a plow B of any suitable construction and is supported at its front end by a transverse axle 10 having ground wheels 11. The delivery mechanism of the magazines is actuated from this axle which is provided for that purpose with driving mechanism of any suitable kind, for instance, a sprocket wheel 12 mounted on the axle and driven by clutch 13, by means of which the dropping mechanism can be disconnected from the driving shaft when not required to be used.

The magazine is secured to the beam on one side between the front axle and the plow and comprises a hopper or downwardly tapering case C closed at the bottom by a plate 14, and an annular row of tubular magazines 15 for the potatoes secured to the inner side of the hopper and opening through the bottom plate 14 which is provided with openings 16 for that purpose.

The hopper C is secured to the beam by any suitable means, for instance, as shown, by a frame 17 which straddles the hopper.

The bottom plate 14 of the hopper is provided with an annular row of discharge openings 18 for the fertilizer, which openings correspond in number and arrangement with the tubular magazines 15. Below the bottom plate 14 the hopper is provided with a rotatable cutoff plate 19 which is provided with a discharge opening 20 for potatoes and a discharge opening 21 for fertilizer arranged to correspond with the openings 16 and 18 in the bottom plate, so that the cutoff plate can be adjusted to coincide with its openings 20 and 21 with any pair of openings 16 and 18 of the bottom plate.

The cutoff plate 19 is mounted to turn on an upright stud 22 which is secured to a cross piece 23 on a supporting bracket 24. Suitable means are provided for securing the cutoff plate in its adjusted position, for instance, as shown, a spring bolt 25 engaging in one of an annular series of depressions formed in a ring 26 secured to the lower portion of the hopper.

27 represents a horizontal rotary feed disk which is arranged below the cutoff plate 19 and provided with a pair of discharge openings 28 and 29 for potatoes and fertilizer, respectively, so arranged that they coincide during the rotation of this disk with the openings 20 and 21 of the cutoff plate. This disk turns about the stud 22 and is provided with a bevel gear rim 30 which is engaged by a pinion 31. The latter is connected with a sprocket wheel 32 which is driven from the front sprocket wheel 12 by a chain 33.

The bracket 24 is provided with a conductor 34 which receives the potatoes and fertilizer from the feed disk 27 and directs the same to the furrow.

The tubular magazines 15 for the potatoes are preferably so proportioned that they hold the potatoes singly, one above the other, whereby the free downward movement of the potatoes in the magazines is insured and lodging of the potatoes in the magazines is prevented. These magazines are made so large in diameter as to receive the largest size of potatoes on which the machine may be used. When much smaller potatoes are to be planted the internal diameter of the tubular magazines can be reduced by tubular filling pieces or lining sleeves 35, Fig. 8, of any suitable construction which are inserted into the magazines and supported therein by projections 36, or other suitable means. The hopper is preferably provided with a cover 37.

In operating the machine the hopper is filled with fertilizer and the tubular magazines with potatoes and the cutoff plate is set to coincide by its openings 20 and 21 with a pair of the discharge openings 16 and 18 of the hopper. In this position the plate closes all of the other pairs of discharge openings in the bottom plate of the hopper. The rotation of the feed disk 27 during the forward movement of the machine causes the openings 28 and 29 of the disk to coincide once during each revolution of the disk with the discharge openings of the cutoff plate and the openings of the hopper over the openings of the plate, whereby a potato is allowed to drop from the respective tubular magazine and a certain amount of fertilizer from the hopper. When the potato magazine has been emptied the cutoff plate is shifted to the next potato magazine and the operation is repeated.

We claim as our invention:

1. In a potato planter, the combination with a fertilizer hopper, of an annular series of upright potato magazines connected therewith, an adjustable cutoff device arranged underneath said hopper and magazines, and a rotary feed disk arranged underneath said cutoff device, substantially as set forth.

2. In a potato planter, the combination with a feed hopper, of an annular series of upright potato magazines arranged on the inner side of the hopper, and means for discharging the potatoes from one magazine at a time together with fertilizer from the hopper and from the different magazines successively, substantially as set forth.

3. In a potato planter, the combination with a feed hopper, of an annular series of upright potato magazines arranged on the inner side of the hopper, a cutoff device capable of adjustment from one magazine to another, and a rotary feed disk arranged beneath the cutoff device, substantially as set forth.

4. In a potato planter, the combination with a feed hopper provided in its bottom with an annular series of discharge openings, of a corresponding series of upright potato magazines arranged within said hopper, an adjustable cutoff plate arranged beneath said hopper and magazines and provided with a pair of discharge openings, one corresponding with the discharge openings of the hopper and the other with the magazines, and a rotary feed plate arranged beneath said cutoff plate and provided with a pair of discharge openings corresponding with the openings in the cutoff plate, substantially as set forth.

Witness our hands in the presence of two subscribing witnesses.

WILHELM REINECKE.
KARL HEINRICH LANDGREBE.
FRIEDRICH GUSTAV WILHELM.

Witnesses:
ADAM SIECKEL,
AUGUST SCHARF.